(12) United States Patent
Wehrle et al.

(10) Patent No.: US 7,199,385 B2
(45) Date of Patent: Apr. 3, 2007

(54) METHOD AND AN APPARATUS FOR THE DETECTION OF OBJECTS MOVED ON A CONVEYOR MEANS BY MEANS OF AN OPTOELECTRONIC SENSOR

(75) Inventors: Klemens Wehrle, Waldkirch (DE); Achim Nübling, Emmendingen (DE); Thomas Kaltenbach, Gutach-Siegelau (DE); Hubert Uhl, Waldkirch (DE)

(73) Assignee: Sick AG, Hamburg (DE)

( * ) Notice: Subject to any disclaimer, the term of this patent is extended or adjusted under 35 U.S.C. 154(b) by 145 days.

(21) Appl. No.: 10/739,893

(22) Filed: Dec. 18, 2003

(65) Prior Publication Data

US 2004/0144934 A1    Jul. 29, 2004

(30) Foreign Application Priority Data

Dec. 20, 2002   (DE)   ............... 102 60 201

(51) Int. Cl.
*G01V 8/00*    (2006.01)
(52) U.S. Cl. ............... 250/559.19; 250/559.24; 250/559.39
(58) Field of Classification Search ........... 250/559.19, 250/559.01, 591, 221, 559.24, 559.39, 223 R; 356/625, 626, 627, 628
See application file for complete search history.

(56) References Cited

U.S. PATENT DOCUMENTS

| | | | |
|---|---|---|---|
| 5,305,895 A | | 4/1994 | Hermann |
| 5,325,178 A | * | 6/1994 | Louis et al. ............... 356/630 |
| 5,661,561 A | * | 8/1997 | Wurz et al. ............... 356/635 |
| 5,672,815 A | * | 9/1997 | Prutu ............... 73/65.07 |
| 5,815,274 A | * | 9/1998 | Dlugos ............... 356/634 |
| 6,061,645 A | * | 5/2000 | Bengala et al. ............... 702/156 |
| 6,194,697 B1 | * | 2/2001 | Gardner, Jr. ............... 250/208.1 |

FOREIGN PATENT DOCUMENTS

CH        682516 A5     9/1993

(Continued)

OTHER PUBLICATIONS

Translation of European Search Report dated Mar. 23, 2004 relating to European Patent Application No. 03 026 260.4.

*Primary Examiner*—Thanh X Luu
*Assistant Examiner*—Kevin Wyatt
(74) *Attorney, Agent, or Firm*—Harness, Dickey & Pierce, P.L.C.

(57) ABSTRACT

The invention relates to a method and to an apparatus for the detection of objects moved on a segmented conveyor means by means of an optoelectronic sensor, in which in each case the geometric center of the objects is determined via the optoelectronic sensor, whereupon the objects are each associated with that conveyor segment in the region of which the respectively determined geometric center is located. The invention further relates to a method and to an apparatus for the determination of the dimensions of objects moved on a conveyor means by means of an optoelectronic sensor, in which the dimensions of the objects are detected and corresponding. object-related values are supplied, and in which the optoelectronic sensor additionally also detects the dimensions of the conveyor means and supplies corresponding, conveyor means-related values, with conveyor means tolerances and/or hollow spaces possibly present between the object and the conveyor means being compensated by an offsetting of the object-related values with the conveyor means-related values.

26 Claims, 4 Drawing Sheets

FOREIGN PATENT DOCUMENTS

| | | |
|---|---|---|
| DE | 4337125 | 5/1995 |
| DE | 19505509 | 8/1996 |
| DE | 19716681 | 10/1998 |
| DE | 4090308 | 2/2000 |
| EP | 0 726 445 A2 | 8/1996 |
| EP | 0 903 681 A1 | 3/1999 |
| EP | 1302742 | 4/2003 |
| WO | WO 90/12310 | 10/1990 |
| WO | WO 96/41126 | 12/1996 |

\* cited by examiner

METHOD AND AN APPARATUS FOR THE DETECTION OF OBJECTS MOVED ON A CONVEYOR MEANS BY MEANS OF AN OPTOELECTRONIC SENSOR

CROSS-REFERENCE TO RELATED APPLICATIONS

This application claims priority to German Patent Application No. 102 60 201.8 filed Dec. 20, 2002. The disclosure of this application is incorporated herein by reference.

FIELD OF THE INVENTION

The present invention relates to a method for the detection of objects moved on a segmented conveyor means and to a method for the determination of the dimensions of objects moved on a conveyor means, and indeed in each case by means of an optoelectronic sensor. The invention furthermore relates to apparatuses for the carrying out of the said methods.

BACKGROUND OF THE INVENTION

Methods and apparatuses of the mentioned type are known from the prior art and are used e.g. in automatic material flow control. Typical areas of application are plants for parcel and letter sorting, automatic baggage sorting plants at airports and plants for the control of automatic goods flows.

When objects are transported on a segmented conveyor means, it occurs relatively frequently in practice, for example on the transport of parcels or valises, that the objects do not lie on a conveyor segment such as a shell or a trough, with their total base surface, but project beyond the respective conveyor segment. It can occur in this case that, in particular when an object projects so far beyond a conveyor segment that it ultimately comes to lie on two adjacent conveyor segments, no correct association can take place between the object and the conveyor segment. This is naturally disadvantageous, since the detection of the objects by means of the optoelectronic sensor should i.a. permit a precise association between the object and the conveyor segment.

In other applications, in which, for example, the dimensions of objects moved on a segmented or on an unsegmented conveyor means should be determined by means of an optoelectronic sensor, it is problematic that the conveyor means is often subject to mechanical tolerances which then result in a falsification of the measured result. The surface of the conveyor means can specifically be located at different absolute heights with different objects to be measured such that different object heights can be determined here with objects at respectively the same heights due to the different absolute heights of the conveyor means surface.

It is furthermore disadvantageous in known systems that, within the framework of the determination of dimensions of the conveyed objects, the latter are only scanned in that region with which they are located in the region of a conveyor segment. Object parts which project beyond a conveyor segment are not detected, which ultimately results in incorrect object dimensions being determined.

SUMMARY OF THE INVENTION

An object of the present invention consequently consists of providing methods and apparatuses of the initially named kind which permit a correct association of the object and of the conveyor segment and/or which permit an at least largely error-free determination of object dimensions.

The first named object is satisfied in accordance with a first variant of the invention by a method in accordance with claim 1 and in particular by a method for the detection of objects moved on a segmented conveyor means by means of an optoelectronic sensor, in which in each case the geometric center (geometric center) of me objects is determined via me optoelectronic sensor, whereupon the objects are each associated with that conveyor segment in the region of which the respectively determined geometric center is located.

An apparatus in accordance with the invention for the carrying out of this method includes a segmented conveyor means as well as an optoelectronic sensor which is coupled to an evaluation unit for the determination of the geometric centers of the objects, with an association unit being provided for the association of the objects with that conveyor segment in the region of which the respectively determined center is located.

The second named object is satisfied in accordance with a second variant of the invention by the features of claim 10 and in particular by a method for the determination of the dimensions of objects moved on a conveyor means by means of an optoelectronic sensor, in which the dimensions of the objects are detected and corresponding, object-related values are supplied, and in which the optoelectronic sensor also detects the dimensions of the conveyor means and supplies corresponding, conveyor means-related values, with conveyor means tolerances and/or hollow spaces possibly present between the object and the conveyor means being compensated by an offsetting of object-related values with the conveyor means-related values.

An apparatus in accordance with the invention for the carrying out of this method includes a conveyor means and an optoelectronic sensor for the detection of the dimensions of the objects and for the provision of corresponding object-related values, with the optoelectronic sensor being designed for the additional detection of the dimensions of the conveyor means and for the provision of corresponding conveyor means-related values, and with a compensation unit being provided for the compensation of conveyor means tolerances and/or of hollow spaces possibly present between the object and the conveyor means.

The first named variant in accordance with the invention makes use of the recognition that the geometric center of an object is as a rule located in the region of the conveyor segment associated with it, irrespective of whether parts of the object project beyond the conveyor segment or not. In accordance with the invention, a correct association between the object and the conveyor segment can be achieved with very high probability by the association taking place in accordance with the invention of an object with that conveyor segment in the region of which the geometric center of the respective object is located.

It is advantageous to have a correct determination of the geometric center for such objects also to be completely detected by the optoelectronic sensor which lie partly outside a conveyor segment or which are located in the region of two sequential conveyor segments. It is ensured by the complete detection of the objects that the contour of the objects extending parallel to the conveyor plane is correctly detected independently of their relative positions with respect to the conveyor segments such that a precise and correct calculation of the geometric center is possible.

The geometric center can generally be determined on the basis of the detected actual base surface of the object, of the detected projected base surface of the object or of the detected object volume. In the first two variants, a distance measurement being carried out by the optoelectronic sensor is not absolutely necessary, whereas such a distance measurement is required for the determination of the object volume.

It is furthermore of advantage if a respective trigger signal is generated for those conveyor segments which were loaded with an object before they reached the detection region of the optoelectronic sensor. Whether a trigger signal is associated with a conveyor segment or not can be decided, for example manually, by a person monitoring the loading procedure. Alternatively, such a trigger signal can also be generated automatically by a master control unit which controls or monitors the loading process of the conveyor means and which accordingly knows whether a specific conveyor segment was loaded with an object.

A trigger signal of the named type preferably characterizes the start and the end of each conveyor segment loaded with an object, with the length in time of the trigger signal preferably corresponding to the length of a conveyor segment extending in the conveying direction. Alternatively, a short single trigger signal could also be associated with the start and the end of each loaded conveyor segment, with the individual trigger signals for the start and for the end of the conveyor segment preferably differing from one another.

A trigger signal lasting over the total length of a conveyor segment can, for example, always be generated in that time interval in which a conveyor segment loaded with an object runs through the detection region of an optoelectronic sensor provided in accordance with the invention. In this case, the period of time in which the optoelectronic sensor scans a conveyor segment loaded with an object and the period in time in which the optoelectronic sensor scans the intermediate space between two sequential conveyor segments or a conveyor segment not loaded with an object can be communicated to the optoelectronic sensor or to an evaluation or a data processing unit. In this manner, a relative association between the object and the conveyor segment related to the respective position can take place without problem, which is equivalent to the fact that it can be communicated to the evaluation unit or data processing unit where precisely object parts are located on a conveyor segment or between two sequential conveyor segments.

An association of the objects with the conveyor segments can thus take place in a simple manner, and indeed by a comparison of the determined positions of the geometric centers of the objects with the positions determined via the trigger signal of the conveyor segments loaded with objects. It is sufficient in this process for only relative positions between the objects and the conveyor segments to be processed.

An association signal can then be output synchronously with, or with a time delay or a path delay relative to the trigger signal. An output of an association signal during or precisely at the end of a trigger signal is not possible in accordance with the invention, since the objects can project beyond the end of a conveyor segment and the complete detection of such objects can thus only be terminated after the end of the trigger signal, that is after the respective conveyor segment has left the detection region of the optoelectronic sensor. An output of an association signal time delayed in comparison with the trigger signal is possible when the conveyor segments move at a constant speed or when the delay time period is set variably in dependence on the speed of the conveyor segments. A path delayed output of the association signal suggests itself when the conveyor segments are coupled to a transducer, for example to a rotary encoder, which respectively communicates to a control unit triggering the output of the association signal how far the conveyor segments have respectively moved away from the detection region of the optoelectronic sensor.

The method in accordance with the invention in accordance with the first variant can be used particularly advantageously when an element on an object, in particular a code, a barcode or an address label, should be detected and associated with an object. In this case, such a detected element can namely always be associated with that object whose geometric center or whose contour extending parallel to the conveyor plane is closest to the detected element. In this manner, it is ensured with high probability that the detected element is associated with the respectively matching object, with it naturally being necessary for this purpose to determine the relative position of the detected element to the detected object or to its geometric center.

In accordance with the second variant of the invention, it is possible to precisely determine the dimensions of objects moved on a conveyor means. This precise determination of the dimensions is possible in accordance with the invention since not only the dimensions of the objects are detected by means of the optoelectronic sensor, but additionally also the dimensions of the conveyor means. In this manner, for example, conveyor means tolerances can be determined quantitatively and can be taken into account in the calculation of the dimensions of the objects. If, for example, objects are transported on a segmented conveyor means in which some conveyor segments are led past the optoelectronic sensor more closely than other conveyor segments, in accordance with the invention the varying spacing between the conveyor segments and the optoelectronic sensor is determined such that, on the determination of the dimensions of the objects, it can clearly be differentiated whether, for example, an object lies higher than another or whether a presumably higher object is only lying on a higher conveyor segment. The described compensation of conveyor means tolerances can be realized in the described example by a simple subtraction of the determined spacing fluctuations between conveyor segments and the optoelectronic sensor from the object-related spacing values.

In the second variant of the invention, it is preferred for the dimensions of the conveyor means and/or of the objects to be detected in all three dimensions. In this manner, for example, a correct volume calculation of the detected objects is possible.

Furthermore, within the framework of the second variant of the invention, the desired dimensions of the conveyor means can be stored and compared with the detected actual dimensions of the conveyor means, with the result of this comparison being used as the correction value for the compensation. The actual dimensions of the conveyor means can be determined, for example, in that the conveyor means free of objects is moved through the detection region of the optoelectronic sensor. The desired dimensions of the conveyor means can, in contrast, be pre-set as fixed numerical values.

It is preferred in both variants of the invention for the objects to be detected continuously by the optoelectronic sensor over their total length extending in the conveying direction and/or over their total width extending transversely to the conveying direction. If both the length and the width of the objects are completely detected, in particular a correct volume calculation becomes possible and the probability for a correct association between objects and transport segments thus also becomes very high.

In certain applications, it is difficult to distinguish objects from one another which are disposed closely to one another or directly adjacent to one another and which are conveyed on a conveyor means. Within the framework of the two variants in accordance with the invention, use can be made of the contours, of the different contrasts and/or of the different colors of the respectively detected objects for this distinguishing. It becomes possible by the additional taking of these parameters into account, in addition to the determined dimensions of the objects, also to distinguish these from one another when they are disposed closely to one another or are directly adjacent to one another.

The two variants in accordance with the invention can also be combined with one another in particular any desired combination of the respectively described preferred embodiments of both variants in accordance with the invention is also possible. It can be achieved by such a combination of both variants in accordance with the invention that, on the transport of objects on segmented conveyor means, a correct association between objects and conveyor means is ensured, on the one hand, and simultaneously a very precise determination of the dimensions of the detected objects becomes possible.

The aforesaid apparatuses for the carrying out of the two variants in accordance with the invention can each be provided with or coupled to an evaluation or data processing unit which is designed such that one or more of the described preferred method variants can be realized. If both variants in accordance with the invention should be realized simultaneously and jointly via a single apparatus, it is naturally possible only to use one single data processing unit which implements all methods in accordance with the invention.

The optoelectronic sensor used in accordance with the invention can be made, for example, as a light barrier or as a scanner or as a camera, with it in particular being made such that it is designed not only for the determination of an object, but moreover also for the determination of spacings. It is particularly preferred for the optoelectronic sensor to be formed as a laser scanner with a scanning direction extending transversely or obliquely to the conveying direction.

The optoelectronic sensor, or an evaluation or data processing unit coupled to it, can be designed for code recognition and/or image processing in order thus additionally to permit the recognition of specific elements, such as barcodes, located on the object.

The conveyor means coming into use in accordance with the invention can be designed, for example, as a conveyor belt, as a shell conveyor, as a trough conveyor or as a cross-belt conveyor.

Further preferred embodiments of the methods and apparatuses in accordance with the invention are described in the dependent claims.

BRIEF DESCRIPTION OF THE DRAWINGS

Both variants of the invention will be explained in the following with reference to embodiments and to the Figures, in which are shown.

DETAILED DESCRIPTION OF THE PREFERRED EMBODIMENTS

The following description of the preferred embodiment(s) is merely exemplary in nature and is in no way intended to limit the invention, its application, or uses.

Figure 1:
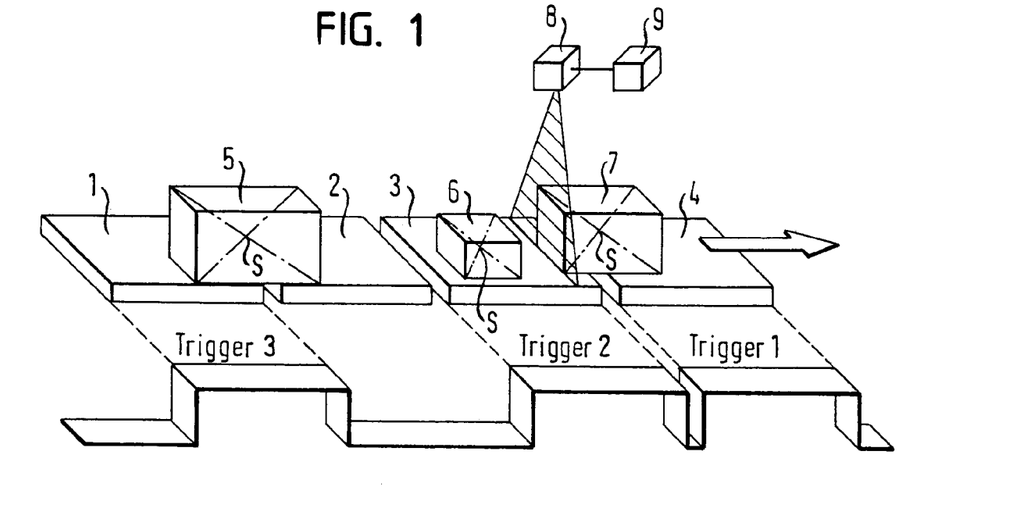
FIG. 1 is a perspective view of a segmented conveyor means with objects located thereon in accordance with the first variant of the invention.

FIG. 1 shows, in a perspective view, a conveyor means which consists of individual conveyor segments 1 to 4 following one another in the conveying direction (arrow). The conveyor segments 1 to 4 are shown schematically in FIG. 1 as square plate elements; in practice, these conveyor segments 1 to 4 can, for example, also be made as troughs or shells. It is in particular also possible to make the whole conveyor means as a cross-belt conveyor in which every single conveyor segment 1 to 4 has a further, separate conveyor means which has a transport transverse to the actual conveying direction of the conveyor means in order thus to permit a loading of the conveyor means or to permit an ejection of objects from the conveyor path.

Individual, differently sized objects 5 to 7, which each have a parallelepiped shape, are located on the conveyor segments 1 to 4. The object 5 is located with regions of similar size on the conveyor segments 1 and 2 and thus also extends over the intermediate space located between these two conveyor segments 1 and 2, with the region lying on the conveyor segment 1, however, being slightly larger than the region lying on the conveyor segment 2. The object 6 is fully located on the conveyor segment 3. The object 7 is located with its larger region on the conveyor segment 4 and with its smaller region on the conveyor segment 3 so that this object 7 also covers the intermediate space located between the conveyor segments 3 and 4.

An optoelectronic sensor 8, which is designed as a laser scanner with a scanning direction extending transversely to the conveying direction, is arranged above the conveyor means consisting of the conveyor segments 1 to 4. The opening angle of the scanning beam is dimensioned in this process to be so large that at least the total width of the conveyor means, preferably, however, an even larger region, can be detected. When the scanning angle is made appropriately large, it is ensured that even very large objects, and in particular also those which project laterally beyond the conveyor segments 1 to 4, can be completely detected.

The optoelectronic sensor 8 is coupled to an evaluation or data processing unit 9 in which the signals delivered by the optoelectronic sensor 8 and the trigger signal explained in the following are processed.

FIG. 1 furthermore illustrates the said trigger signal which characterizes those conveyor segments 1, 3, 4 which were previously loaded with an object 5, 6, 7. For better understanding, the trigger signal was also entered above the location in FIG. 1 (as also in FIGS. 3 to 6), although the trigger signal is present in practice as a signal changeable over time. The trigger signal can specifically, for example, always be active when a region of a conveyor segment 1, 3, 4 previously loaded with an object 5, 6, 7 is located in the detection region of the optoelectronic sensor. Vice versa, the trigger signal is always passive when regions of a conveyor segment 2 previously not loaded with an object or an intermediate space between two sequential conveyor segments 1 to 4 are located in the detection region of the optoelectronic sensor. The trigger signal thus delivers information to the evaluation circuit 9, synchronously to the values detected in each case by the optoelectronic sensor, on whether a conveyor segment 1, 3, 4 previously loaded with an object 5 to 7, a respective intermediate space located between the conveyor segments, or a conveyor segment 2 not previously loaded with an object is detected by the optoelectronic sensor.

In a method in accordance with the prior art, the optoelectronic sensor 8 always only scans when a trigger signal is applied. In the example of FIG. 1, the conveyor segments 4, 3 and 1 were accordingly completely scanned, but not the intermediate spaces located between the conveyor segments 1 to 4 and also not the conveyor segment 2. In accordance with the prior art, this then has the consequence that only that region of the object 7 was detected on the conveyor segment 4 which is located on the conveyor segment 4, whereas the region of the object 7 located on the conveyor segment 3 was detected as a separate object. Instead of a single object 7, two smaller objects were therefore detected in an erroneous manner, of which one is located on the conveyor segment 3 and another on the conveyor segment 4. The same would apply correspondingly in accordance with the prior art to the object 5 which is located with different regions on the conveyor segments 1 and 2. Accordingly, in accordance with the prior art, no correct check is possible as to whether an object which was placed on a conveyor segment, is still actually on this conveyor segment in the region of the optoelectronic sensor 8.

In accordance with the first variant of the invention, detection now does not only take place by the optoelectronic sensor 8 when a trigger signal is applied. A continuous detection of the objects 5 to 7 rather takes place which is not interrupted at any time, independently of whether they are located on one conveyor segment 1 to 4 or in the region of an intermediate space formed between the conveyor segments 1 to 4. Since a complete detection of the objects 5 to 7 is always ensured in this manner, in accordance with the invention, the geometric center S of the objects 5 to 7 can be determined in the evaluation or data processing unit 9 by means of a suitable method. Since the trigger signal is moreover also available to the evaluation or data processing unit 9, the relative position of the determined centers S to the conveyor segments 1 to 4 can be determined. It is then accordingly also possible to determine that conveyor segment 1 to 4 above which a specific geometric center S is located. An association of the objects 5 to 7 specifically then takes place with those conveyor segments 1 to 4 in the region of which the geometric center of the objects 5 to 7 is respectively located. In the example in accordance with FIG. 1, the geometric center of the object 5 is located in the region of the conveyor segment 1; the geometric center of the object 6 in the region of the conveyor segment 3; and the geometric center of the object 7 in the region of the conveyor segment 4. A total of three objects 5 to 7 are therefore recognized in a correct manner which are each respectively associated with those conveyor segments 1, 3 and 4 on which they were originally placed.

In FIGS. 2 to 6 explained in the following, the optoelectronic sensor 8 and the evaluation or data processing unit 9 are not shown for reasons of clarity, although these elements 8, 9 are also present in arrangements in accordance with FIGS. 2 to 6.

Figure 2:
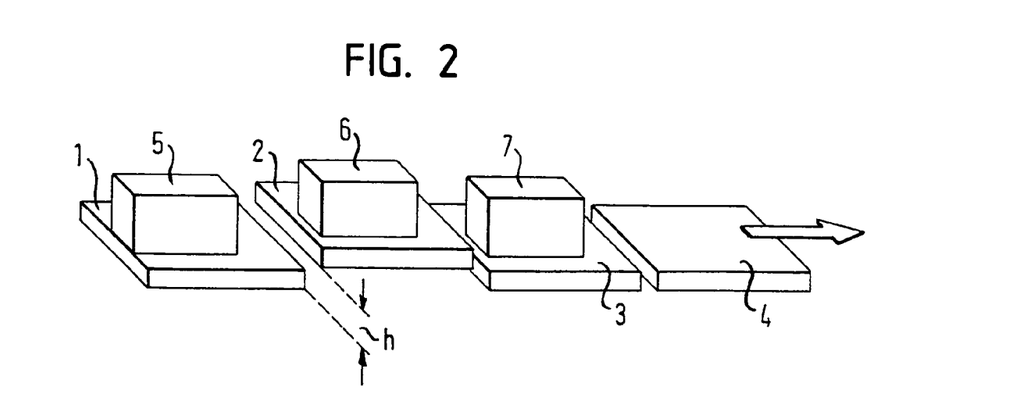
FIG. 2 is a view corresponding to FIG. 1 with a conveyor segment vertically offset with respect to the other conveyor segments.

FIG. 2 shows an arrangement in accordance with FIG. 1, with the conveyor segment 2 here being raised by an amount h with respect to the other conveyor segments 1, 3, 4 as a consequence of tolerances. This would result, in accordance with a prior art, on the scanning of the object 6, which is located on the raised conveyor segment 2, in a height of the object 6 being determined which was larger by the amount h with respect to the object 6. If, in this case, the values determined by the optoelectronic sensor 8 were then used for the calculation of the volume or of the dimensions of the object 6, an error would occur due to the raised position of the conveyor segment 2.

In accordance with the invention, the optoelectronic sensor 8 not only detects the object 6, but also those regions of the conveyor segment 2 which are not covered by the object 6. Alternatively, the optoelectronic sensor 8 could also detect the empty conveyor segment 2 within the framework of a test run. In addition to the values related to the object, values exclusively related to the conveyor segment 2 can in any case also be made available to the evaluation or data processing unit (9) so that ultimately the height position of the conveyor segment 2 is known. When the desired height of the conveyor segment 2, which corresponds to the height of the conveyor segments 1, 3, 4 not subject to tolerances, is also known to the evaluation or data processing unit 9, the deviation of the actual height of the conveyor segment 2 with respect to the desired height can be calculated and this deviation can be included in the calculation of the dimensions or of the volume of the object 6 as a correction value. In this manner, in accordance with the invention, the dimensions or the volume of the object 6 can also be calculated correctly when the height of the conveyor segment 2 deviates from its desired height, as shown in FIG. 2.

Figure 3:
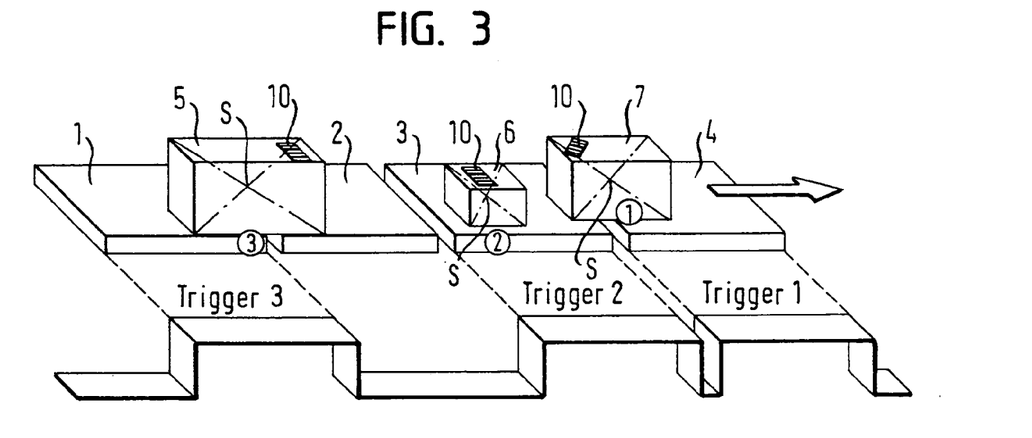
FIG. 3 is a view in accordance with FIG. 1 with objects which bear a barcode.

FIG. 3 shows a representation in accordance with FIG. 1 with the difference that respective barcodes 10 are applied to the objects 5 to 7. The problem often occurs in this process in accordance with the prior art that it is not clear with which object a detected barcode should be associated. In accordance with methods known from the prior art, the region of the conveyor segment is usually determined in which a barcode is located, whereupon this barcode is associated with that object which is likewise located on the respective conveyor segment. This can result in errors when two objects which are different from one another are detected on one conveyor segment or when an object projects beyond a conveyor segment.

The problem described is satisfied in accordance with the invention in that a detected barcode 10 is always associated with that object whose geometric center S is closest to the detected barcode 10. The geometric center S and the position of the barcode 10 are determined in accordance with FIG. 3 in the same way as already explained with respect to FIG. 1. In this manner, an unambiguous and correct association of a barcode with an associated object 5 to 7 becomes possible, and indeed independently of whether the object 5 to 7 projects beyond a conveyor segment 1 to 4 or whether two objects 6, 7 are located within the region of one single conveyor segment 3. A correct association of the barcode 10 with the object 7 is even possible when the barcode 10 is located outside that conveyor segment 4 with which the object 7 is associated in accordance with the position of its geometric center S, since the spacing of the barcode 10 from the geometric center S of the object 7 is also lower in this case than the spacing of the named barcode 10 from the geometric centers of the other objects 5, 6.

Figure 4:
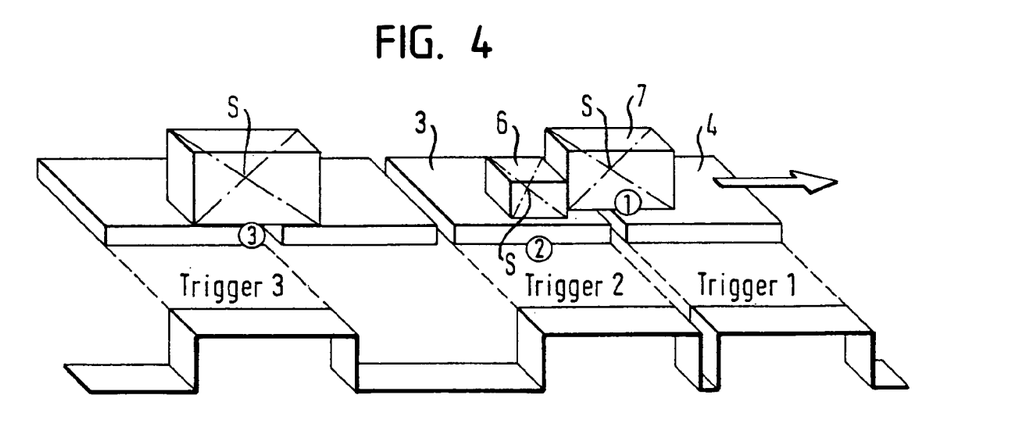
FIG. 4 is a view in accordance with FIG. 1 with two objects contacting one another.

FIG. 4 illustrates that the methods in accordance with the invention even function when two objects 6, 7 contact one another and there is accordingly no gap between these two objects 6, 7. It is only necessary for the correct procedure of the methods in accordance with the invention that the optoelectronic sensor can make a distinction, for example via the determination of the geometry of the two objects 6, 7 contacting one another, between both objects. If it is, for example, known that only parallelepiped shaped objects occur, in the example shown in FIG. 4, a distinguishing can already take place between the two objects 6, 7 solely on the basis of their different heights. Alternatively, it would, however, also be possible to detect by means of the optoelectronic sensor 8 at least three corner points of the surface of each object 6, 7, from which the position of the objects 6, 7 can then be calculated.

Alternatively or additionally, the objects 6, 7 contacting one another can also be distinguished from one another on the basis of their contours, of their contrast and/or of their color, with these parameters also being detectable by the optoelectronic sensor 8.

Figure 5:
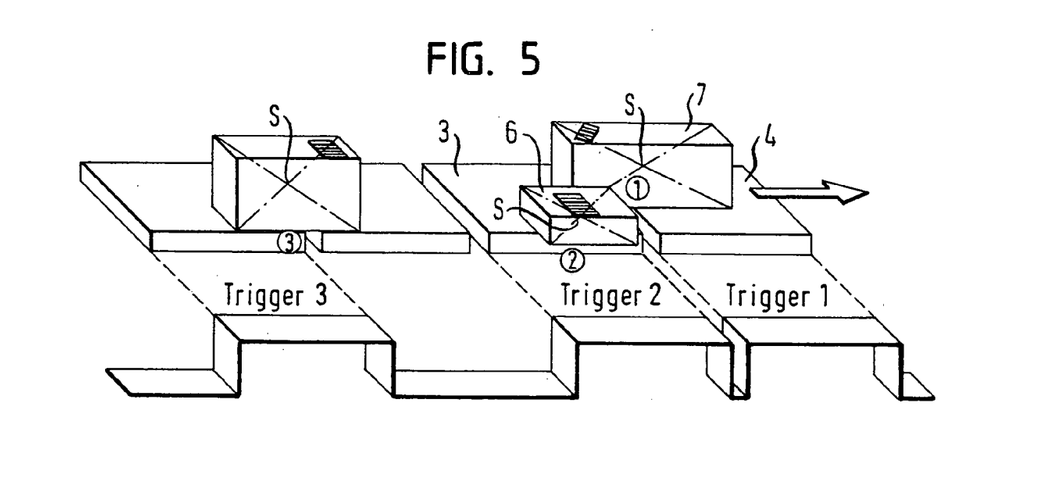
FIG. 5 is a view in accordance with FIG. 1 with objects overlapping one another in the conveying direction.
Figure 6:
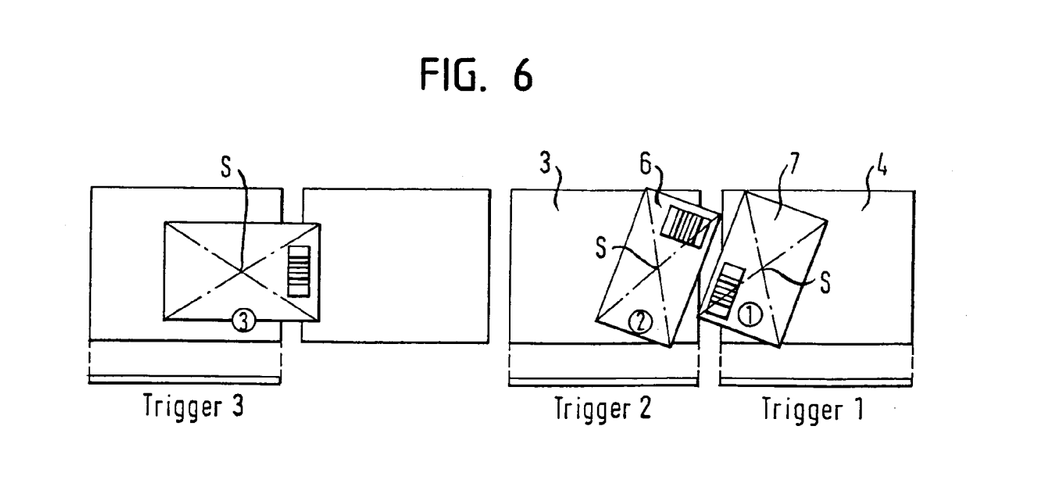
FIG. 6 is a plan view of an arrangement in accordance with FIG. 1 with objects overlapping one another in the conveying direction.

The distinguishability described in accordance with FIG. 4 of objects 6, 7 contacting one another is, in accordance with FIGS. 5 and 6, also given with such objects which lie on the conveyor segments 1 to 4 offset laterally to one another in the conveying direction or whose longitudinal extents extending in the transport direction overlap one another. In FIGS. 5 and 6, two respective objects 6, 7 are shown in which the named condition applies. A distinguishability of the objects 6 and 7 is also possible without problem in the arrangements shown in FIGS. 5 and 6 on the basis of the geometry, of the contour, of the contrast and/or of the color of the objects 6, 7 determined by means of the optoelectronic sensor 8.

Figure 7:
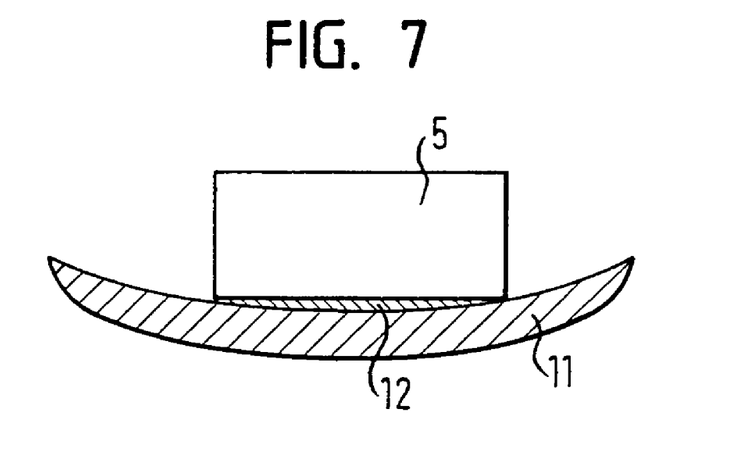
FIG. 7 is a section through a shell-shaped conveyor segment with an object located thereon, with the section extending transversely to the conveying direction.

FIG. 7 shows a conveyor segment formed as a shell 11 in a sectional representation with an object 5 located thereon.

If now in such an arrangement in accordance with a method in accordance with the prior art, the volume of the object 5 should be determined, the volume 12 included between the object 5 and the shell 11 as a rule results in a measurement error.

In accordance with the invention, however, the geometry of the surface of the shell 11 can be determined before the actual measurement procedure, for example by scanning or by fixed value defaults such that the volume 12 included between the object 5 and the shell surface can be calculated on the basis of these known values and can be deducted from the volume determined in the actual measurement procedure. It is, however, required that the object 5 has a planar base surface, since otherwise a varying geometry of the base surfaces of objects 5 lying on shells 11 would result in different values with respect to the volumes included between the object 5 and the shell 11.

With a planar base surface of the objects 5, a correct determination of the object volume is, however, possible in accordance with the invention due to the calculatory taking into account of the included volume 12.

Figure 8:
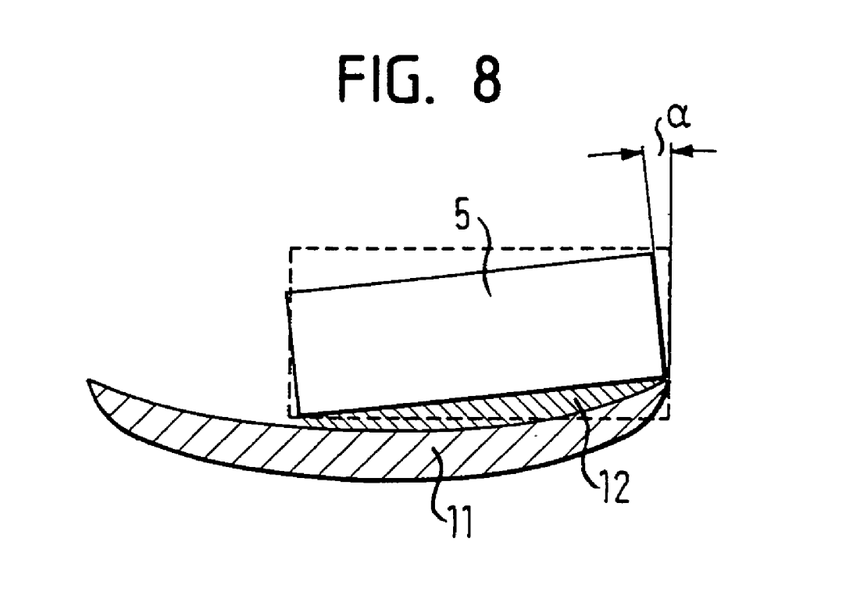
FIG. 8 is a view in accordance with FIG. 7 with an object tilted with respect to FIG. 7.

The advantages in accordance with the invention determined with respect to FIG. 7 are also achievable with an arrangement in accordance with FIG. 8, in which the object 5 lies on the shell 11 tilted by an angle α. The tilt angle α can namely be determined by a complete scan of the object 5 by means of the optoelectronic sensor 8 and can be taken into account in the calculation of the volume 12 included between the object 5 and the shell 11.

In a method in accordance with the prior art, it would in contrast as a rule only be possible to determine the smallest surrounding parallelepiped shown in dotted form in FIG. 8 which, as can easily be seen from FIG. 8, has a much larger volume than the actual object 5. In accordance with the invention, however, a correct calculation of the volume of the object 5 is possible.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for detecting objects moved on a segmented conveyor means using an optoelectronic sensor, comprising:
   determining a geometric center (S) of each of the objects via the optoelectronic sensor, and
   associating each of the objects with a respective conveyor segment over which the respective geometric center (S) is located, wherein an object that straddles a plurality of conveyor segments is associated with a single segment over which its respective geometric center (S) is located.

2. A method in accordance with claim 1, characterized in that such objects are also completely detected which lie partly outside a conveyor segment or which are located in two sequential conveyor segments.

3. A method in accordance with claim 1, characterized in that the geometric center (S) is generally determined on the basis of a detected actual base surface of the object, on a detected projected base surface of the object or on a detected object volume.

4. A method in accordance with claim 1, characterized in that a trigger signal is generated for those conveyor segments which are loaded with an object.

5. A method in accordance with claim 4, characterized in that the length in time of a trigger signal corresponds to the length of a conveyor segment extending in a conveying direction such that the trigger signal characterizes the start and the end of the conveyor segment.

6. A method in accordance with claim 4, characterized in that the association of the objects with the conveyor segments takes place by a comparison of determined positions of the geometric centers (S) of the objects with the positions determined via the trigger signal of the conveyor segments loaded with objects.

7. A method in accordance with claim 4, characterized in that an association signal can then be output synchronously, or with a time delay or a path delay relative to the trigger signal.

8. A method in accordance with claim 1 characterized in that an element, in particular a code, a barcode or an address label, located on an object is detected and associated with the object.

9. A method in accordance with claim 8, characterized in that a detected element is associated with the object whose geometric center (S) or whose contour extending parallel to the conveyor plane is closest to the detected element.

10. A method for determining dimensions of objects moved on a conveyor means using an optoelectronic sensor, comprising:
    detecting dimensions of objects,
    supplying corresponding, object-related values based on the dimensions of the object,
    detecting dimensions of the conveyor means using the optoelectronic sensor, wherein the conveyor means includes a non-planar surface over which a planar surface of the object lies, and supplying corresponding, conveyor means-related values based on the dimensions of the conveyor means, wherein conveyor means tolerances and/or hollow spaces possibly present between the object and the conveyor means are compensated for by offsetting of the object-related values with the conveyor means-related values.

11. A method in accordance with claim 10, characterized in that the dimensions of the conveyor means and/or of the objects are detected in all three dimensions.

12. A method in accordance with claim 10, characterized in that desired dimensions of the conveyor means are stored and compared with detected actual dimensions of the conveyor means, with the result of this comparison being used as the correction value for the compensation.

13. A method in accordance with claim 1 characterized in that the objects are detected continuously by the optoelectronic sensor over their total length extending in a conveying direction and/or over their total width extending transversely to the conveying direction.

14. A method in accordance with claim 10 characterized in that the objects are detected continuously by the optoelectronic sensor over their total length extending in a conveying direction and/or over their total width extending transversely to the conveying direction.

15. A method in accordance with claim 1, characterized in that objects lying close to one another or adjacent to one another are distinguished from one another on the basis of their contours, of their contrast and/or of their color.

16. A method in accordance with claim 10, characterized in that objects lying close to one another or adjacent to one another are distinguished from one another on the basis of their contours, of their contrast and/or of their color.

17. A method for detecting objects moved on a segmented conveyor means using an optoelectronic sensor, comprising:
determining the respective geometric centers (S) of each of the objects via the optoelectronic sensor,
associating each object with the conveyor segment over which the respective geometric center (S) is located, wherein an object that straddles a plurality of conveyor segments is associated with a single segment over which its respective geometric center (S) is located;
determining dimensions of the objects moved on the conveyor means using the optoelectronic sensor,
supplying corresponding, object-related values based on the dimensions of the objects,
detecting dimensions of the conveyor means using the optoelectronic sensor, and
supplying corresponding, conveyor means-related values, wherein conveyor means tolerances and/or hollow spaces possibly present between the object and the conveyor means are compensated for by offsetting of the object-related values with the conveyor means-related values.

18. An apparatus for detecting objects moved on a segmented conveyor means, comprising:
an optoelectronic sensor that is coupled to an evaluation unit for determining respective geometric centers (S) of the objects, and for associating the objects with a respective conveyor segment over which the respective geometric center (S) is located, wherein an object that straddles a plurality of conveyor segments is associated with a single segment over which its respective geometric center (S) is located.

19. An apparatus in accordance with claim 18, characterized in that a data processing unit is provided for the detection of the geometric center (S) of the objects is respectively determined via the optoelectronic sensor, whereupon the objects are each associated with the respective conveyor segment which the respectively determined center (S) is located.

20. An apparatus in accordance with claim 18, characterized in that a data processing unit is provided for receiving signals from the optoelectronic sensor, with the objects being detected continuously over their total length extending in a conveying direction and/or over their total width extending transversely to the conveying direction.

21. An apparatus for determining dimensions of objects moved on a conveyor means comprising:
an optoelectronic sensor that detects dimensions of objects and that provides corresponding object-related values, wherein the optoelectronic sensor also detects dimensions of the conveyor means and provides corresponding conveyor means-related values, the conveyor means having a non-planar surface over which a planar surface of the object lies, and
a compensation unit that compensates for conveyor means tolerances and/or of hollow spaces possibly present between the object and the conveyor means by offsetting of the object-related values with the conveyor means-related values.

22. An apparatus in accordance with claim 21 characterized in that a data processing unit is provided; and in that the optoelectronic sensor also detects the dimensions of the conveyor means and supplies corresponding, conveyor means-related values to the data compensation unit, with conveyor means tolerances and/or hollow spaces possibly present between the object and the conveyor means being compensated by offsetting of the object-related values with the conveyor means-related values.

23. An apparatus in accordance with claim 18, characterized in that the optoelectronic sensor is designed as a light barrier, as a scanner or as a camera, with it being made in particular for distance measurement.

24. An apparatus in accordance with claim 23, characterized in that the optoelectronic sensor is formed as a laser scanner with a scanning direction extending transversely or obliquely to a conveying direction.

25. An apparatus in accordance with claim 18, characterized in that the optoelectronic sensor, or an evaluation unit coupled to it is designed for code recognition and/or for image processing.

26. An apparatus in accordance with claim 18, characterized in that the conveyor means is made as a conveyor belt, as a shell conveyor, as a trough conveyor or as a cross-belt conveyor.

* * * * *

UNITED STATES PATENT AND TRADEMARK OFFICE
CERTIFICATE OF CORRECTION

PATENT NO. : 7,199,385 B2 Page 1 of 1
APPLICATION NO. : 10/739893
DATED : December 18, 2003
INVENTOR(S) : Klemens Wehrle et al.

It is certified that error appears in the above-identified patent and that said Letters Patent is hereby corrected as shown below:

On the Title Page, Item (73)
The Assignee "SICK AG, Hamburg (DE)" should be --SICK AG, Waldkirch (DE)--

Signed and Sealed this

Twenty-first Day of August, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,199,385 B2 |
| APPLICATION NO. | : 10/739893 |
| DATED | : April 3, 2007 |
| INVENTOR(S) | : Klemens Wehrle et al. |

It is certified that error appears in the above-identified patent and that said Letters Patent is hereby corrected as shown below:

On the Title Page, Item (73)
The Assignee "SICK AG, Hamburg (DE)" should be --SICK AG, Waldkirch (DE)--

This certificate supersedes Certificate of Correction issued August 21, 2007.

Signed and Sealed this

Eighteenth Day of September, 2007

JON W. DUDAS
*Director of the United States Patent and Trademark Office*